United States Patent [19]
Murphy

[11] Patent Number: 5,876,010
[45] Date of Patent: Mar. 2, 1999

[54] COMBINATION COMPUTER MOUSE PAD AND WRITING PAD

[76] Inventor: Kevin M. Murphy, 1990 Del Amo Blvd., Suite A, Torrance, Calif. 90501

[21] Appl. No.: 787,827

[22] Filed: Jan. 23, 1997

[51] Int. Cl.⁶ .................................................. A47B 91/00
[52] U.S. Cl. ........................ 248/346.01; 248/918; 281/2
[58] Field of Search ............... 248/346.01, 118, 248/918; 281/2, 51

[56] References Cited

U.S. PATENT DOCUMENTS

| | | | |
|---|---|---|---|
| 2,132,121 | 10/1938 | Nudelman | 720/93 |
| 4,799,054 | 1/1989 | House | 340/710 |
| 4,834,502 | 5/1989 | Bristol et al. | 350/322 |
| 4,884,826 | 12/1989 | Slagsvol | 281/2 |
| 4,907,824 | 3/1990 | Smirnoff | 281/45 |
| 5,197,659 | 3/1993 | Smith et al. | 248/118 |
| 5,217,781 | 6/1993 | Kuipers | 428/85 |
| 5,340,075 | 8/1994 | Schriner | 248/346.1 |
| 5,358,766 | 10/1994 | Field | 428/77 |
| 5,405,168 | 4/1995 | Holt | 281/2 |
| 5,508,084 | 4/1996 | Reeves et al. | 428/172 |
| 5,542,637 | 8/1996 | Schriner | 248/346.01 |

*Primary Examiner*—Leslie A. Braun
*Assistant Examiner*—Anita M. King
*Attorney, Agent, or Firm*—James G. O'Neill

[57] ABSTRACT

A combination mouse pad and writing pad comprised of a plurality of sheets of paper secured together and further secured to a chip board base, with each of the sheets of paper having a textured surface with a large number of shaped "micro-domes" thermographically printed thereon and spaced apart between 0.005" and 0.100". The sheets of paper are secured together along two substantially perpendicular side edges and to the base which has a non-skid backing.

5 Claims, 2 Drawing Sheets

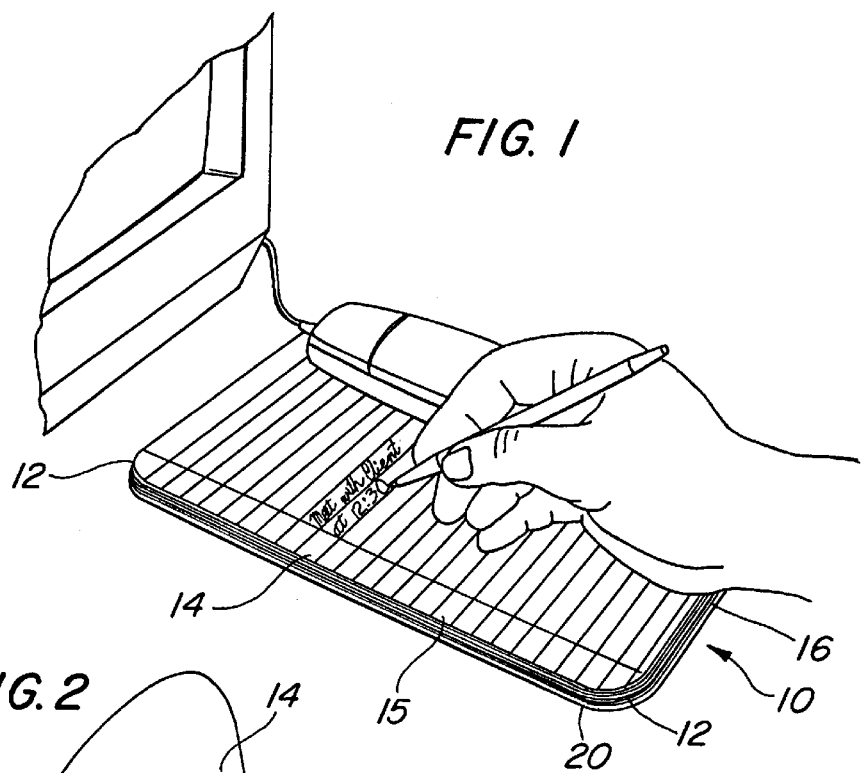
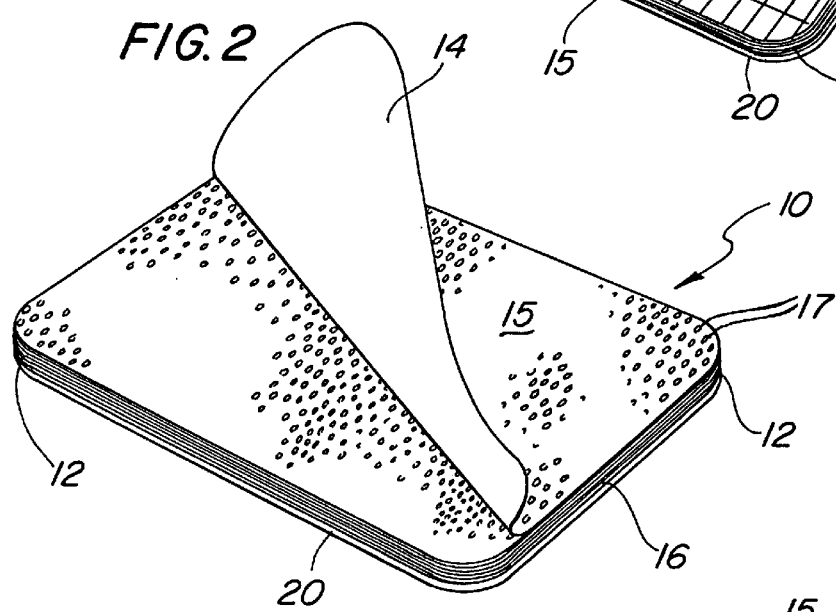
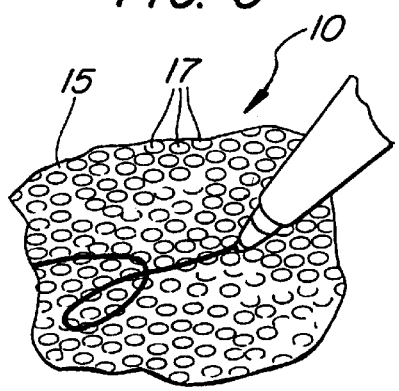
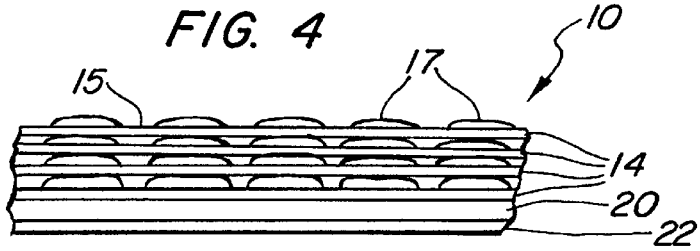

COMBINATION COMPUTER MOUSE PAD AND WRITING PAD

BACKGROUND OF THE INVENTION

1. Field of the Invention

This invention relates generally to writing pads, and more particularly, to a writing pad that may also be used as a computer mouse pad.

2. Description of Related Art

Numerous types of writing pads are known for use to take notes or draft letters or the like. These writing pads are usually comprised of a series of sheets of paper held together on a chip board base by an adhesive or glue strip, and are of limited use, in that they are only used to write on in pencil or ink. Known writing pads do not have a surface which provides sufficient friction so that it can also be used to operate a computer mouse thereon.

Therefore, it is well known to use a computer mouse pad to allow a computer user to more accurately operate a mouse connected to a computer, such as a personal computer. Such mouse pads come in many different varieties and include various types of operating surfaces. However, to enable the mouse to be properly operated, the surface should provide sufficient friction to allow a one-to-one relationship between the linear movement of the mouse across the surface and the rotational movement of a track ball in the mouse. It has been found that the best operating surfaces of mouse pads have a uniform random texture to provide friction, and are of sufficient hardness that the mouse will not experience excessive drag.

Using separate mouse pads and writing pads take up precious space on already cramped working surfaces. Therefore, some of the known mouse pads have been designed with more than one purpose or use in mind.

One such prior art mouse pad having a dual purpose is shown in U.S. Pat. No. 5,405,168, which discloses a combination mouse pad and note pad. The combination pad includes a working surface on which notes can be written and a computer mouse operated. The combination pad includes a plurality of secured together sheets of paper further secured to a chip board base. The sheets of paper are fabricated from textured paper, preferably 70 pound, CLASSIC (registered trademark) Laid Text Paper, such as that used in letterhead paper. This paper provides an embossed surface over which a computer mouse may be operated. The plurality of sheets of paper are secured together at opposing edges, such as the top and bottom, with glue strips. However, as this patent points out, since the surface is so rough, it is not easy to write on the surface of such paper, and, therefore, notes cannot be smoothly written on the surface. Also, this patent suggests that other papers, such as bond paper cannot be used. Furthermore, it has been found that it is not always easy to tear off a sheet of paper from such a combination pad, without tearing the sheet itself. Finally, the chip board base used in the combination pad of this patent has been found to move or slip when supported on a smooth desk or other surface when trying to write thereon, and/or move a mouse across its top surface.

In U.S. Pat. No. 5,340,075 there is disclosed an ergonomic mouse pad which includes a polymorphic top surface for supporting a mouse and a curved region for facilitating the comfort and ease of use of the hand and wrist of a mouse user. This mouse pad, however, cannot be written upon.

U.S. Pat. No. 5,217,781 discloses a mouse pad composed of number of layers of specific plastics with a bottom non-skid layer. This mouse pad, also does not provide a surface which can be written upon.

U.S. Pat. No. 4,799,054 discloses a mouse pad having a specific control surface having a random uniform texture formed on a control layer supported on a resilient intermediate layer. Optionally, the control layer is formed from a transparent material and an information display can be provided on the side of the control layer opposite from the control surface that allows visual information to be permanently displayed. However, this mouse pad also cannot be written upon.

While the foregoing described prior art devices provide some limited improvements in mouse pads, there still remains the need in the art for a combination mouse pad and writing pad that may be more cheaply made using substantially any available paper or similar material, and which is easily and conveniently used to take notes neatly thereon, as well as smoothly operate a computer mouse thereon. And, which pad may easily have a sheet of paper torn off of it top without tearing the sheet, and which includes a base which will not move or slip when trying to remove a sheer of paper, write on, and/or move a mouse across its top surface.

SUMMARY OF THE INVENTION

Accordingly, it is a general object of the present invention to provide an improved mouse pad. It is a particular object of the present invention to provide a mouse pad providing multiple features. It is a still more particular object of the present invention to provide an improved mouse pad which may also be used as a writing pad. It is yet a more particular object of the present invention to provide an improved mouse pad having a writing surface on which notes may be neatly taken, and which has a non skid supporting surface. It is a further particular object of the present invention to provide an improved combination mouse pad and writing pad which has a top surface which may be smoothly written upon, allows a computer mouse to operate thereon, and also acts to clean the mouse track ball. And, it is still a further particular object of the present invention to provide an improved combination mouse pads and writing pad having a layer of material added to a chip board base to prevent the combination mouse pad and writing pad from slipping or moving on a supporting surface.

In accordance with one aspect of the present invention, there is provided a mouse pad comprised of a plurality of sheets of paper which are secured together and further secured to a chip board base. Each of the sheets of paper is formed from a paper having a surface layer thermographically printed thereon so as to provide a textured surface which allows an ideal surface to operate a mouse on. And, which sheets of paper are secured together along two adjacent side edges and to a base having a non-skid surface.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

FIG. 1 is a partial perspective view of a preferred embodiment of a combination mouse pad and writing pad of the present invention supported on a working surface, adjacent a computer, showing a user writing on the top surface thereof, adjacent a computer mouse supported on the top surface;

FIG. 2 is a further perspective view of a mouse pad in accordance with the present invention, showing a top sheet partially lifted from the pad in preparation to tear it off the top of the pad;

FIG. 3 is an enlarged partial perspective view of one embodiment of a top surface of the sheets of the pad of the present invention, showing micro-dome bumps thermographically printed thereon;

FIG. 4 is an enlarged partial cross-sectional view of a further embodiment of the pad of the present invention, showing different shaped micro-dome bumps or designs thermographically printed on the top surface of each sheet of paper, and a non-skid layer on the bottom of the base.

DESCRIPTION OF THE PREFERRED EMBODIMENTS

Figure 5:
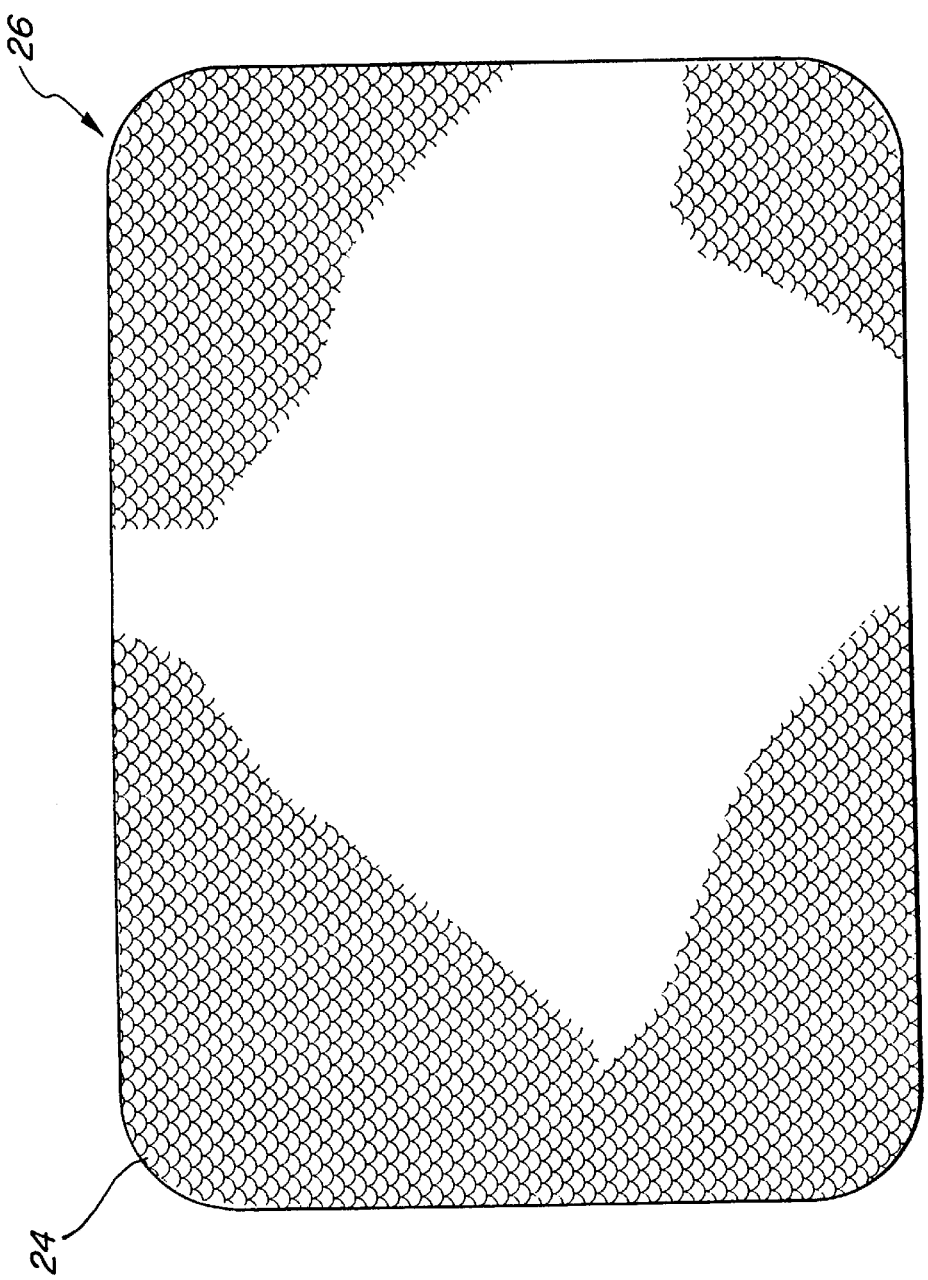
FIG. 5 is a top plan view of a further embodiment of the combination mouse pad and writing pad of the present invention, showing the presently preferred embodiment of scales thermographically printed on the top surface thereof.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a description of an improved combination mouse pad and writing pad indicated generally at 10.

The combination pad 10 can be of any desired size or thickness, but is preferably formed so as to be substantially rectangular, approximately 8 and ½ inches by 7 and ¼ inches, with rounded corners 12 and approximately ¼ of an inch thick. A plurality of separate sheets 14, fabricated from any type of paper, such as bond paper, and which has a top textured surface 15 printed thereon by a thermographic process well known to those skilled in the art, are secured together along two substantially perpendicular side edges 16, 18 and to a base 20. The sheets 14 are secured together and to the base 20 by securing means such as staples, sewing, an adhesive, or glue of types well known to those skilled in the art. The base 20 is preferably formed from a chip board and a non-slip surface 22 is applied to the lower or bottom surface thereof. The non-slip surface 22 may consist of a gummy back, such as a label adhesive, or a latex applied to or printed on the bottom of the chip board base 20, or a textured rubberized layer or strip may be secured to the lower surface.

As best shown in FIGS. 2–4, at least the majority of the top surface 15 of each separate sheet 14, where the tracking a computer mouse would take place, has thousands of "micro-dome" bumps, designs, or the like 17, printed thereon. These micro-dome bumps may be formed or printed on the top surface 15 in any desired manner, preferably by a thermographic printing process using clear or colored ink. Any desired configuration or design, such as dots, grids, scales, squares, waves, x's, or the like may be used by forming a screen having the desired design formed therein. In the preferred embodiments of the invention, the design is printed so as to have a spacing or incidence of friction therebetween of from 0.005" to 0.100". That is, in the surface 15 as shown in FIGS. 3–4, the micro-dome bumps 17, whether formed as circles, ovals, or scales are printed so as to have a minimum height, and a spacing of from 0.005" to 0.100" therebetween. Although all of the micro-dome bumps 17, no matter what shape, thermographically printed on the surface form a random textured surface which provides a sufficient coefficient of friction necessary to continuously contact the track ball of a computer mouse as it moves across the same, without any irregularities or spaces therein, not all of such surfaces are easy or smooth to write upon. Through extensive testing it has been found that a textured surface, such as 24 printed with scales as shown on a combination pad 26 in FIG. 5, with a spacing of approximately 0.005" between the scales, provides a surface which properly operates a tracking ball, and is the best surface on which to write. That is, the scale surface 24 provides a surface which may be neatly and smoothly written on in ink or pencil.

Through such testing it has also been found that with a textured surface of the present invention thermographically printed on a surface, such as 15 or 24, a further surprising result has been discovered. Specifically, it has been found that as the track ball of a computer mouse moves across the surface 15 or 24, the surface will clean the track ball and mouse base. That is, the surface 15 or 24 picks up or removes any accumulated debris or dirt that might be on the mouse housing lower surface, the track ball, or in the mouse housing area where the track ball rotates. This picked up or removed dirt or debris will adhere to the surface 15 or 24 because of the micro domed bumps printed thereon, and will not be picked up again by the track ball or mouse.

It, therefore, can be seen that the present invention provides a novel combination mouse pad and writing surface which allows a computer mouse to track across it and at the same time allows a user to make notes thereon and easily tear them off when needed, without moving the pad or tearing the sheet being removed.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A combination computer mouse pad and writing pad comprising, in combination:

a plurality of sheets of paper; each of said plurality of sheets of paper having four side edges, a top surface and a bottom surface; each top surface being textured by having a plurality of micro scales thermographically printed over substantially the entire top surface to define a working surface which may be neatly and smoothly written on and for engaging and cleaning a track ball and a base surface of a computer mouse thereon;

a base having four edges, an upper surface and a lower surface; said lower surface having a non-skid layer secured thereto; and securing means along two substantially perpendicular side edges of each of said plurality of sheets of paper and two substantially perpendicular side edges of said base to secure said plurality of sheets of paper to each other and to said upper surface of said base so as to form said combination computer mouse pad and writing pad, with a first of said working surfaces facing outwardly, away from said upper surface of said base, and the remaining working surfaces facing a bottom surface of an adjacent one of said plurality of sheets of paper.

2. The combination computer mouse pad and writing pad of claim 1 wherein said micro scales are printed about 0.005" apart.

3. The combination computer mouse pad and writing pad of claim 2 wherein said non-skid layer on said lower surface of said base consists of a rubberized backing.

4. A combination computer mouse pad and writing pad comprising, in combination:

a plurality of sheets of paper; each of said plurality of sheets of paper having four side edges, a top surface and a bottom surface; each top surface having a scales design printed over substantially the entire top surface spaced about 0.005" apart by a thermographic process so as to define a working surface which may be neatly and smoothly written on and for engaging and cleaning a track ball and a base surface of a computer mouse thereon;

a base having four edges, an upper surface and a lower surface; said lower surface having a rubberized non-skid layer secured thereto; and securing means along two perpendicular side edges of each of said plurality of sheets of paper and along two perpendicular edges of said base to secure said plurality of sheets of paper to each other and to said upper surface of said base so as to form said combination computer mouse pad and writing pad.

5. A combination computer mouse pad and writing pad comprising, in combination:

a plurality of separate sheets of paper; each of said plurality of separate sheets of paper having four side edges, a top surface and flat bottom surface; each top surface having a textured design printed thereon;

said textured design printed on substantially the entire top surface of each sheet of paper being in the form of micro scales so as to define a working surface which may be used for neat and smooth writing and for engaging and cleaning a track ball and a lower surface of a computer mouse thereon;

a base having four edges, an upper surface and a lower surface, said lower surface having a separate, rubberized, non-skid layer secured thereto; and securing means formed only along two adjacent and perpendicular side edges of each of said plurality of separate sheets of paper and along two corresponding adjacent and perpendicular edges of said base, to secure said plurality of separate sheets of paper to each other and to said base, along the two adjacent and perpendicular side edges so as to form said combination computer mouse pad and writing paper wherein separate sheets of paper may be easily torn off, one at a time, without ripping.

\* \* \* \* \*